Dec. 3, 1929.  D. F. TWISS ET AL  1,738,268
MANUFACTURE OF TUBES OF INDIA RUBBER OR
SIMILAR MATERIAL AND APPARATUS THEREFOR
Filed Oct. 17, 1927    2 Sheets-Sheet 2

Inventors
Douglas Frank Twiss.
Edward Arthur Murphy.
By their Attorney

Patented Dec. 3, 1929

1,738,268

UNITED STATES PATENT OFFICE

DOUGLAS FRANK TWISS AND EDWARD ARTHUR MURPHY, OF BIRMINGHAM, ENGLAND, ASSIGNORS TO DUNLOP RUBBER COMPANY LIMITED, OF BIRMINGHAM, ENGLAND, A BRITISH COMPANY

MANUFACTURE OF TUBES OF INDIA RUBBER OR SIMILAR MATERIAL AND APPARATUS THEREFOR

Application filed October 17, 1927, Serial No. 226,597, and in Great Britain October 21, 1926.

This invention comprises improvements in the manufacture of india-rubber or the like tubes and to apparatus therefor.

According to the most usual present practice, rubber, previously masticated and mixed with the desired compounding ingredients, has been shaped into tubular form by forcing through the annular die or nozzle of an extruding machine. In an alternative process the said rubber has been formed into sheets, and shaped and consolidated into tubular form on a suitable mandrel. And recently it has been suggested that latex should be extruded from an annular nozzle into a fluid coagulant; thereby forming a tube of coagulated rubber about a core of uncoagulated latex readily removable.

According to this invention we form a tube of rubber or the like material such as gutta-percha, balata or analogous vegetable resins by applying a solution or an aqueous dispersion of such substance to the interior surface of a revolving cylinder. Where an aqueous dispersion is employed it may be natural or artificial, preserved or otherwise, and may be compounded and/or concentrated, and may if desired contain any vulcanizing ingredients usual in rubber manufacture. In the case of a solution we may add compounding and vulcanizing ingredients if desired.

In order that the invention may be easily understood and readily carried into effect the same will now be described with reference to the accompanying drawings in which:—

Figure 1:
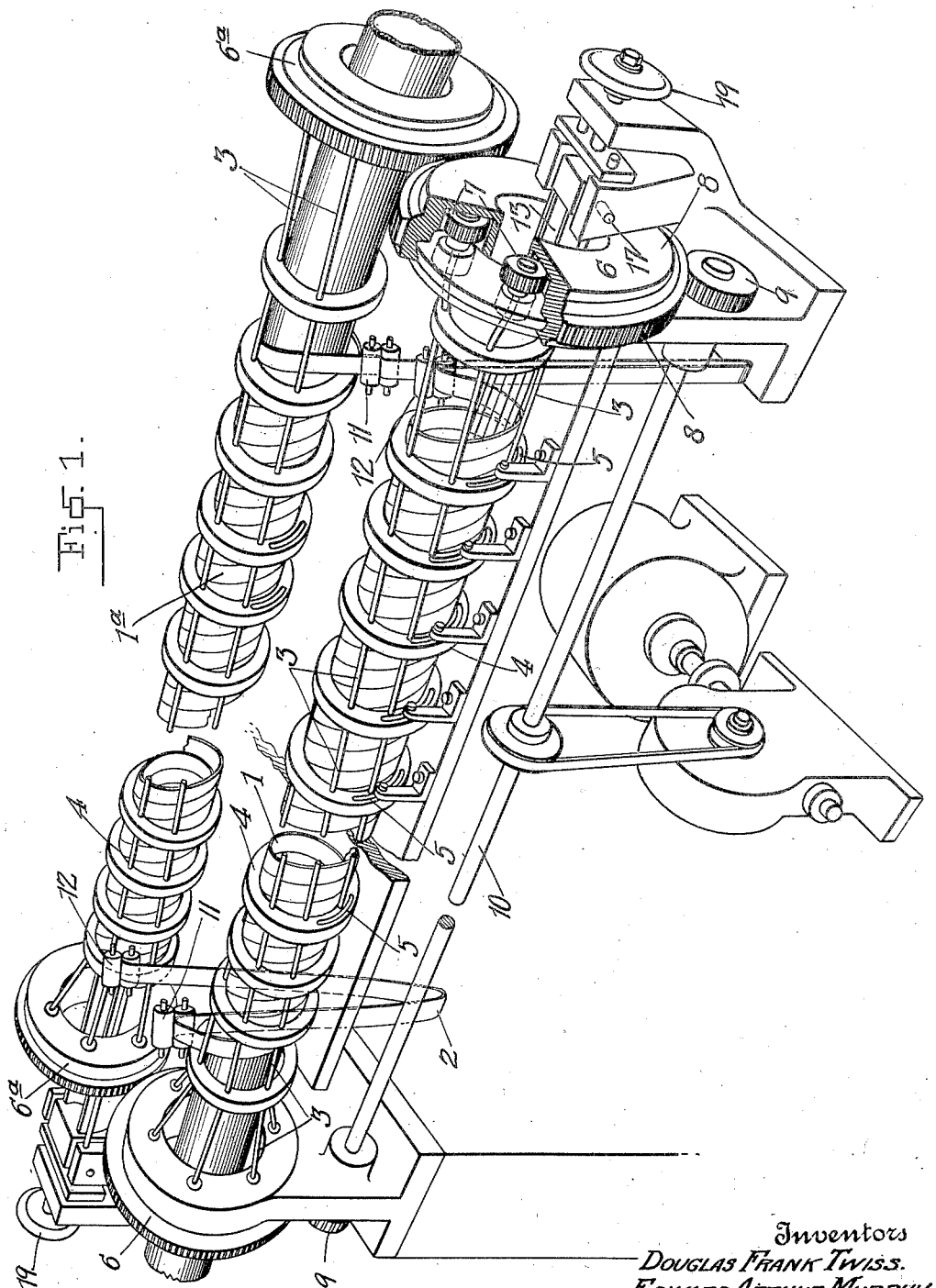
Fig. 1 is a perspective view of the preferred apparatus for carrying our invention into effect.

Referring to Figure 1, the rotating cylinder 1, upon the inner surface whereof the tube of latex is formed, is constituted by an endless flexible band 2 wound spirally as shown into tubular form, the correct formation of said spiral being maintained with the assistance of cable guides 3 adapted to transmit motion to the said cylinder as hereinafter said.

The said cables 3 are supported in stationary annular brackets 4 in such a manner as to be rotatable therein about their own axis but restrained thereby in fixed spirals about the surface of the said cylinder 1.

The cables 3 lie substantially at right angles to the convolutions of the band 2, and to arrive at and maintain that precise angle—required to obviate slip relative between the said cables and the said band—we provide that the brackets 4 are individually rotationally adjustable as shown at 5.

Upon the said cables being rotated as hereinafter said it will be apparent that the frictional drive transmitted thereby to the convolutions of the cylinder 1 will maintain the said cylinder in continuous movement.

To rotate the said cables we utilize gear systems 6, the cable ends being attached rigidly to pinions 7 all said pinions being simultaneously driven by an annulus 8 itself rotated by a pinion 9 on a driven shaft 10.

The cables 3 being of some considerable length, the same are preferably positively driven from either end; two sets of gearing 6 being provided as shown in the drawing, said sets being synchronized and actuated by the common driving shaft 10.

We may alternatively or additionally actually apply a driving force to the spiral band itself.

The spirally wound band 2, being in continuously progressive movement, is necessarily endless, and a particularly convenient and economical disposition of the return is shown in Figure 1. Two complementary cylinders 1 and 1$^a$ are formed by one endless band the same being guided off one cylinder onto the other by suitably disposed rollers 11 and 12 respectively preferably extraneously friction driven to assist in the maintenance of the cylinder convolutions in the correct formation.

Motion is transmitted to the said return cylinder 1$^a$ in the manner described in connection with its complementary cylinder, the system 6 and 6$^a$ being geared together so as to propel the said cylinders 1 and 1$^a$ respectively in opposite directions as is required by the opposite travel directions of the convolutions of the said cylinders.

The mixture or solution from which the tubes are to be formed is introduced as hereinafter described into the said cylinders and is gradually transferred therealong by the screw-like action of the spiral band 2 whereof the said cylinder is formed. The uniform distribution of the mixture as a layer upon the inner surface of the cylinder is effected by the influence of the progressively revolving motion, the said material issuing continuously from the said cylinder—at the end opposite to the end of its introduction—as a perfectly formed length of tubing of uniform thickness of wall.

Figure 2:
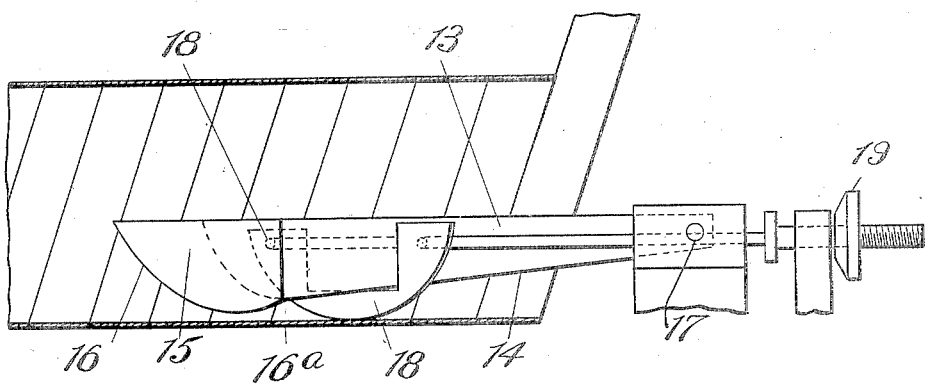
Figs. 2 and 3 are end elevational and plan views respectively showing the material feed in more detail, in Fig. 2 and front of the cylinder and in Fig. 3 the top of the cylinder having been removed for the sake of clearness.
Figure 3:
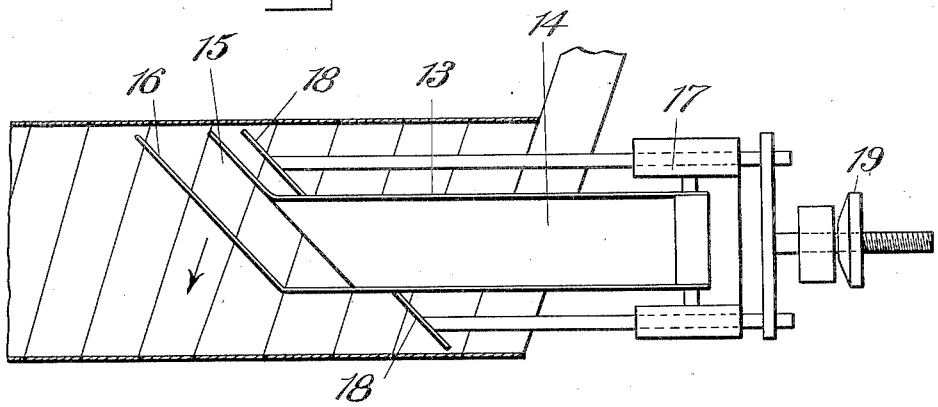

A convenient means for introducing the said material comprise, as shown particularly in Figures 2 and 3, a tray 13 having a sloping floor 14 down which the mixture gravitates into the cylinder flowing thereonto through an opening 15 in the said floor.

To ensure that the quantity of material introduced is continuously uniform, the end of the tray 13 carries a distribution plate 16 between the edge of which and the cylinder wall —through the gap 16ª formed between said edge and said wall—the said material is constrained to flow in its passage into the said cylinder. The thickness of the resultant tubes may be varied by varying the gap 16ª, that is the space between the arcuate peripheral edge of said plate 16 and the inner surface of the cylinder wall formed by the band 2. This we provide for as shown in the drawings by pivoting the tray at 17 and supporting it upon a stirrup 18 horizontally displaceable by a handwheel 19 to bear against the sloping floor 14 of the tray 13 and so swing the said tray about its pivot 17.

The tube, formed or forming, may be treated in a variety of ways varying necessarily with the nature or state of the material used.

For instance, if vulcanized latex is used we may simply provide for air to flow continuously through the tube merely to dry off the water content thereof.

While if the latex is unvulcanized but carrying all the necessary ingredients to effect vulcanization we may cause the said air to be heated to the necessary temperature to effect vulcanization.

Again, if the latex contains an incomplete vulcanizing agent the complementary ingredient required to effect the vulcanizing reaction may be added by causing a suitable gas or vapour to flow continuously through the tube or to impinge upon the surface of the tube in the passage thereof.

Or if the latex is devoid of vulcanizing agents the same may be added to effect vulcanization by causing different gases or vapours consecutively to impinge against the walls of the tube in its passage along the interior of the cylinder.

And of course coagulation also, may, where appropriate, be occasioned by the flow of a suitable gas or vapour through the said cylinder.

It is not to be construed of course that we are limited to the precise details hereinbefore set out. To exemplify, in the treatment of the tube, we do not limit ourselves to the precise methods said as for instance the cylinders may be heated extraneously to effect vulcanization and/or to assist drying, or, again, the tube may be treated subsequently to instead of during its formation—either in one of the appropriate ways described or in any other convenient manner.

Again, while it has been assumed in the foregoing description of the apparatus that the material employed is of thick consistency such as to be susceptible of spreading, it will be apparent that we may alternatively employ materials of much thinner consistency.

Again, in the apparatus, while the spreading device shown is particularly convenient for the application of material of thick consistency it is not to be construed that we are limited to such a device as, for instance when material of a thinner consistency is employed, we might use a nozzle or the like to feed it to the cylinder or alternatively we might use a spray.

In the apparatus, instead of a cylinder formed by a band, as 2, we may use a solid cylinder adapted to be rotated; the device for applying the material being then adapted to be successively moved along the length of the interior of the cylinder—the said cylinder may be formed in sections separable to facilitate the removal of the finished tube.

And still again, in the apparatus, we do not confine ourselves to the cable drive described as for instance we may use instead suitably arranged, individual friction rollers. Or if we do use cables we may mount them other than in the way described. For instance, once the correct speed of the cable has been established, we may dispense with the adjusting feature—to exemplify instead of the brackets 4 we may use a tube having the appropriate spirals, to house said cables, cut into its inner surface.

Further the cylinder may be constructed of porous material thereby accelerating the drying of the tube.

While we have referred specifically to the manufacture of rubber and similar articles according to the process and by the apparatus hereinbefore described, the said process is applicable to the manufacture of any article formed substantially of organic materials which organic materials are capable of being introduced into the cylinder in the form of an aqueous dispersion with or without inorganic materials and of being dried in tubular form.

For example, the invention is applicable to the manufacture of tubes of fibrous material.

What we claim is:

1. Apparatus for forming continuously a tube of any desired length from a solution or aqueous dispersion of an organic material comprising an endless band adapted to move helically so as to form a hollow cylinder and a feeding device arranged to discharge said solution or dispersion inside said hollow cylinder whereby its helical movement forms a tube of said material.

2. Apparatus for forming continuously a tube of any desired length from a solution or dispersion of an organic material comprising an endless band adapted on moving helically to form a hollow cylinder and arranged to receive said solution or dispersion, a feeding device discharging inside said hollow cylinder, and friction members extending longitudinally of said cylinder and adapted to be rotated and to make frictional driving contact with the outer surface of said band.

3. Apparatus for forming continuously a tube of any desired length from a solution or dispersion of an organic material comprising a stationary feeding device, an endless band adapted on moving helically to form a hollow cylinder and arranged to receive said solution or dispersion from said feeding device and by its helical movement to form a tube of said material, and driving means for driving said band, said feeding device being arranged to deliver its contents inside said cylinder.

4. Apparatus for forming continuously a tube of any desired length from a solution or dispersion of an organic material comprising a stationary feeding device, an endless band adapted on moving helically to form a hollow cylinder and arranged to receive on its inner surface said solution or dispersion from said feeding device and by its helical movement to form a tube of said material, and driven cables extending externally and longitudinally of said cylinder and adapted on rotation to drive said band.

5. Apparatus for forming continuously a tube of any desired length from a solution or dispersion of an organic material comprising a stationary feeding device, an endless band adapted on moving helically to form a hollow cylinder surrounding said feeding device and arranged to receive said solution or dispersion on its inner surface and by its helical movement to form a tube of said material, friction members extending longitudinally of said cylinder and adapted to be rotated and to make frictional driving contact wtih the outer surface of said band, and adjustable brackets for supporting said friction members.

6. Apparatus for forming continuously a tube of any desired length from a solution or dispersion of an organic material comprising a stationary feeding device, an endless band adapted on moving helically to form a hollow cylinder and arranged to receive said solution or dispersion from said feeding device and by its helical movement to form a tube of said material, driven cables extending externally and longitudinally of said cylinder and adapted on rotation to drive said band, and adjustable brackets for supporting said driven cables, said feeding device being arranged to deliver said solution or dispersion to the interior of said cylinder.

7. Apparatus for forming continuously a tube of any desired length from a solution or dispersion of an organic material comprising an endless band adapted on moving helically to form a hollow cylinder and a feeding device arranged to deliver said solution or dispersion to the interior surface of said cylinder to form a tube of said material, and friction rollers adapted on their rotation to drive said band.

8. Apparatus for forming simultaneously and continuously two tubes of any desired length from a solution or aqueous dispersion of an organic material comprising two stationary feeding devices for said solution or dispersion and an endless band adapted to move in two distinct helices so as to form two hollow cylinders around said feeding devices respectively and by the movement of said helices to form two tubes of said material.

9. Apparatus for forming a tube from a solution or aqueous dispersion of an organic material comprising a stationary feeding device for said solution or dispersion, an endless band adapted to move helically so as to form a hollow cylinder and arranged to receive said solution or dispersion from said feeding device on its inner surface and by its helical movement to form a tube of said material, and a feed-controlling means for controlling the amount of said solution of dispersion fed by said feeding device on to said band.

10. Apparatus for forming a tube from a solution or aqueous dispersion of an organic material comprising an endless band adapted to move helically so as to form a hollow cylinder and a feeding device arranged to discharge said solution or dispersion on the inner surface of said band to form a tube of said material, and feed-controlling means for varying the thickness of the layer of material applied to said band.

11. Apparatus for forming a tube of a material which can flow or spread comprising a pivotally mounted feeding device for material, an endless band adapted to move helically so as to form a hollow cylinder and arranged to receive on its inner surface, the material from said feeding device and by its helical movement to form a tube of said material, and a member adapted by its movement to vary the gap between said feeding device and the inner surface of said hollow cylinder.

12. Apparatus for forming a tube from a solution or aqueous dispersion of india rubber, gutta percha, balata or like material, comprising an endless helically disposed band forming a hollow cylinder, a feeding device arranged to feed said material on to the inner surface of said cylinder, means for imparting a relative movement between said cylinder and said feeding device and means for continuously propelling said band.

13. Apparatus for forming a tube from a solution or aqueous dispersion of india rubber, gutta percha, balata or like material comprising an endless helically disposed band forming a hollow cylinder, a feeding device arranged to feed said material on to the inner surface of said cylinder, means for imparting a relative movement between said cylinder and said feeding device and means for withdrawing the endless band at one end and for leading it back at the other end of the hollow cylinder formed thereby.

14. Apparatus for forming a tube from a solution or material capable of flowing or spreading, comprising a helically disposed band forming a hollow cylinder, a feeding device arranged to feed said material on the inner surface of said cylinder, and driving means frictionally engaging said band.

15. Apparatus for forming a continuous tube from a solution or material capable of flowing or spreading, comprising a helically disposed endless flexible band having a portion thereof forming a hollow cylinder and rotating drive members for continuously advancing the band.

16. Apparatus for forming a continuous tube from a solution or material capable of flowing or spreading, comprising a helically disposed endless flexible band forming a hollow cylinder and rotating drive members frictionally engaging said band and extending substantially at right angles thereto, said drive members being flexible and extending helically with respect to the cylinder.

17. Apparatus for forming a continuous tube from a solution or material capable of flowing or spreading, comprising a helically disposed endless flexible band forming a hollow cylinder and rotating drive members frictionally engaging said band and continuously advancing it in the same direction, said drive members extending substantially at right angles thereto and means for adjustably supporting said drive members.

18. In the manufacture of tubes in continuous lengths from solutions or aqueous dispersions of india rubber, gutta percha, balata or analogous materials, the method which comprises continuously applying such material at a substantially uniform rate at one end of the inner surface of a mold formed by a helically travelling mold band whereby the progressive helical motion of the band distributes the material and continuously ejects the tube produced at the opposite end of said mold.

19. In the manufacture of tubes in continuous lengths from solutions or aqueous dispersions of india rubber, gutta percha, balata or analogous materials, the method which comprises continuously applying such material continuously from a fixed supply source to the inner surface of a hollow cylindrical mold formed of an endless helically travelling band whereby the material is distributed from said fixed source throughout the length of the mold and emerges at a point remote from said fixed source as a formed tube.

20. In the manufacture of tubes in continuous lengths from solutions or aqueous dispersions of india rubber, gutta percha, balata or analogous materials, the method which comprises continuously applying such material continuously from a fixed supply source to the inner surface of a hollow cylindrical mold formed of an endless helically travelling band whereby the material is distributed from said fixed source throughout the length of the mold and emerges at a point remote from said fixed source as a formed tube and subjecting the tubing to treatment in such manner as to accelerate or to complete the formation thereof for example by coagulation, vulcanization or drying.

In witness whereof, we have hereunto signed our names.

DOUGLAS FRANK TWISS.
EDWARD ARTHUR MURPHY.